United States Patent
Spitz et al.

[11] 3,941,450
[45] Mar. 2, 1976

[54] DEVICE FOR RECORDING A MATRIX OF HOLOGRAPHIC LENSES

[75] Inventors: Erich Spitz; Jean Pierre Huignard; Odile Royer, all of Paris, France

[73] Assignee: Thomson-CSF, Paris, France

[22] Filed: June 26, 1973

[21] Appl. No.: 373,781

[30] Foreign Application Priority Data
June 30, 1972 France .................. 72.23763

[52] U.S. Cl. ............... 350/3.5; 350/162 ZP
[51] Int. Cl.$^2$ ... G02B 5/32; G03H 1/16; G03H 1/30
[58] Field of Search .......... 350/3.5, 162 SF, 162 ZP

[56] References Cited
UNITED STATES PATENTS

| | | | |
|---|---|---|---|
| 3,405,614 | 10/1968 | Lin et al. | 350/3.5 |
| 3,530,442 | 9/1970 | Collier et al. | 350/3.5 |
| 3,536,371 | 10/1970 | Post | 350/3.5 |
| 3,571,603 | 3/1971 | Bryant et al. | 350/162 SF |
| 3,628,847 | 12/1971 | Bostwick | 350/3.5 |

OTHER PUBLICATIONS
Dammann et al., Optics Communications, Vol. 3, No. 5, July 1971, pp. 312–315.
Boivin, Applied Optics, Vol. 11, No. 8, Aug. 1972, pp. 1782–1792.

*Primary Examiner*—Ronald J. Stern
*Attorney, Agent, or Firm*—Cushman, Darby & Cushman

[57] ABSTRACT

The invention relates to a device for recording a matrix of holographic lenses such that each lens, upon illumination by a monochromatic parallel beam produces a diffracted beam passing by a same common fixed aperture, which may be the pupil of a lens. In this device, an appropriate two-dimensional diffraction grating creates as many diffracted beams as there are lenses to be recorded, which beams interfer with a single parallel beam at the level of a photosensitive substrate. It is thus possible to carry out simultaneous recording of all the lenses of the matrix, which can afterwards be used in the recording of storage planes for optical stores.

7 Claims, 10 Drawing Figures

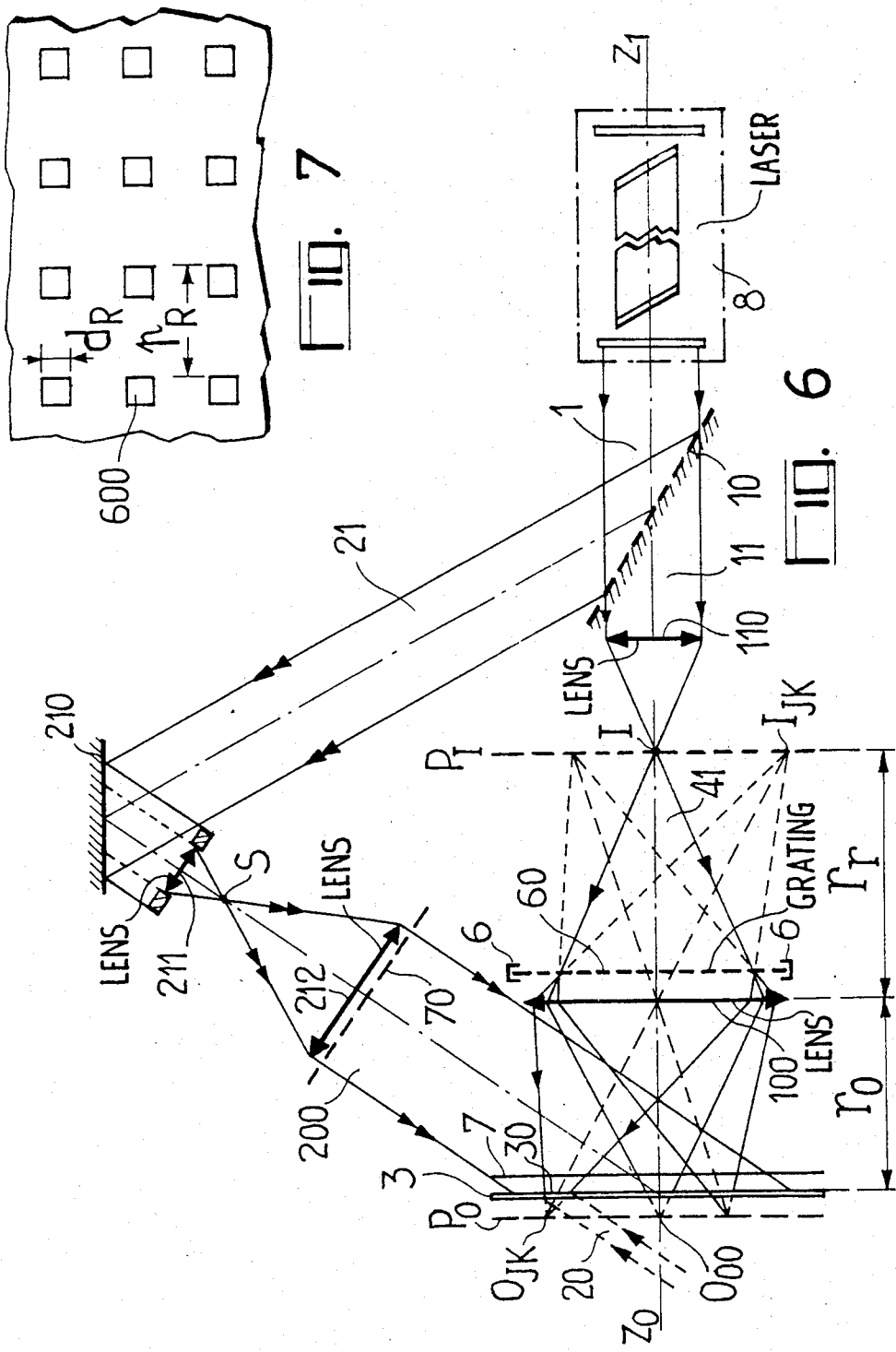

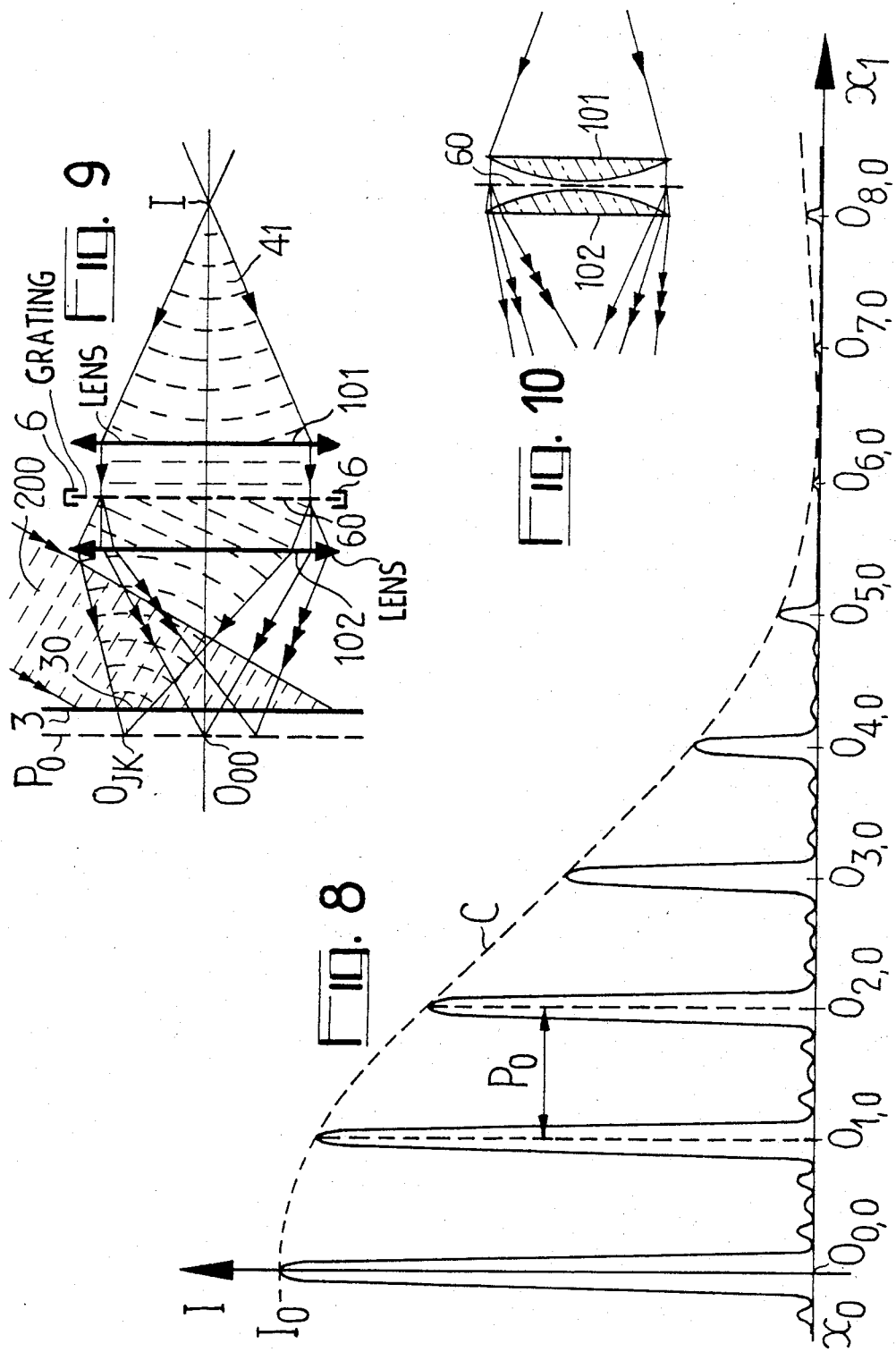

DEVICE FOR RECORDING A MATRIX OF HOLOGRAPHIC LENSES

BACKGROUND OF THE INVENTION

The present invention relates to a device for recording a matrix of holographic lenses, said matrix being intended in particular for the recording of matrices of microholograms which form the storage planes of an optical store.

It should be pointed out that, here as well as in the whole of the remainder of this description, the word matrix is intended to indicate a flat assembly of elements having identical dimensions, arranged in the forms of rows or columns of uniform spacing or pitch; it should be pointed out, too, that the term "light" is utilised in its widest possible acceptation and is intended to indicate all kinds of electromagnetic radiation, extending, inclusive of the ultra violet, up to the infra red.

At the present time, for purposes of information storage in optical stores, "storage planes" constituted by matrix of microholograms, are used; each of these microholograms is the hologram of a data plane made up of a flat assembly of light or dark squares, each data plane thus containing a large number of data bits in binary form.

To record these storage planes, each data plane is successively illuminated by one and the same main objective lens which produces an object beam, and the corresponding hologram is recording upon a photosensitive substrate by the additional use of a reference beam. In respect of each microhologram, at the same time that the data plane is changed, it is necessary to simultaneously displace the reference beam parallel to itself and also the beam illuminating the objective lens.

DESCRIPTION OF THE PRIOR ART

To avoid the need for this latter operation, it has been proposed that a matrix of lenses should be associated with the main objective lens; such a matrix comprises then as many elements as there are microholograms in the storage plane, each lens being so contrived that when illuminated by a parallel beam of fixed direction, it produces a divergent beam covering the entry pupil of the main objective lens. A fixed coherent light source, coupled to an XY deflector and a beam-splitter, then produces two moving beams of fixed direction, one of which successively illuminates each lens of the matrix whilst the other is utilised as a reference beam.

It has also been proposed that this matrix of lenses should take the form of a matrix of holographic lenses; each lens is then constituted by the recording, upon a photosensitive substrate, of a network of fringes produced by interference between two light beams, generally obtained from the same coherent radiation source, or by copying such a recording. However, if, as is then the case, all the lenses of the matrix have different characteristics, the successive recording of each of them constrains the operator, with each operation, to adjust the respective positions of the two interfering beams; as a consequence, the time required to produce a matrix rapidly becomes prohibitive as the number of elements involved increases.

SUMMARY OF THE INVENTION

It is one object of the invention to overcome this drawback of the prior art and to provide a device for carrying out simultaneous recording of the whole of the lenses forming the matrix.

Another object of the invention is to utilise successively, at first for the recording of the matrix of lenses and then, for the recording of the matrix of microholograms constituting the storage plane, one and the same objective lens which, although having a wide field, necessitates only minor correction as far as the various aberrations are concerned.

According to the present invention, there is provided a device for recording a matrix of holographic lenses, each of said lenses, when illuminated by a monochromatic parallel light beam of fixed direction, producing a diffracted beam, the whole of said diffracted beams thus produced passing through a same fixed common opening, said device comprising:

a radiation source emitting a beam of coherent light, splitting means for splitting said beam into a first and a second beam, a plate of photosensitive material, first optical means for providing from said first beam a parallel beam illuminating on said plate an area at least equal to the area of said matrix; and second optical means, including stigmatic optical means and diffracting means, for providing from said second beam a plurality of converging diffracted beams interfering in said plate with said parallel beam.

For a better understanding of the invention as well as other objects and further features thereof, reference is made to the following detailed disclosure of the preferred embodiments of the invention taken in conjunction with the accompanying drawings thereof, wherein:

BRIEF DESCRIPTION OF THE DRAWINGS

FIG. 6 illustrates the diagram of a second optical device in accordance with the invention, enabling to carry out simultaneous recording of all the lenses which constitute the matrix;

FIG. 7 illustrates a part of the diffraction grating which can be utilised in the device of FIG. 6;

FIG. 8 illustrates the distribution of the diffracted light coming from the grating shown in FIG. 7;

FIG. 9 illustrates a variant embodiment of the optical device shown in FIG. 6.

FIG. 10 illustrates a portion of the embodiment of FIG. 9.

DESCRIPTION OF THE PREFERRED EMBODIMENTS

Figure 1:
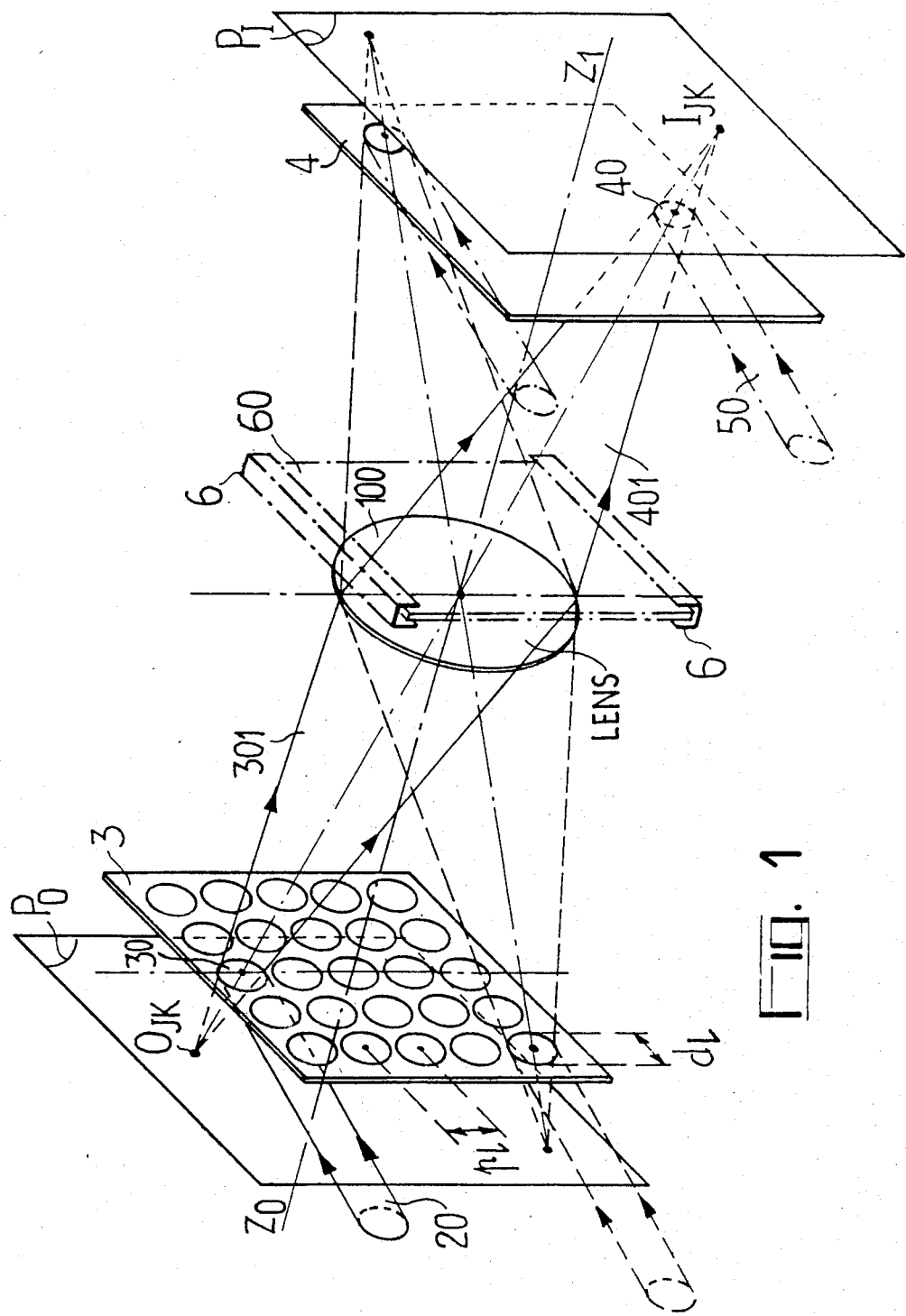
FIGS. 1 and 2 are explanatory figures pertaining to the operation of a matrix of lenses in accordance with the invention and illustrating its possible use for the recording of a matrix of holograms.

FIG. 1 describes the operation of a matrix of lenses similar to that which can be produced by the device in accordance with the invention, and also describes its use for the recording of a storage plane constituted by a matrix of a microhologram.

Figure 2:
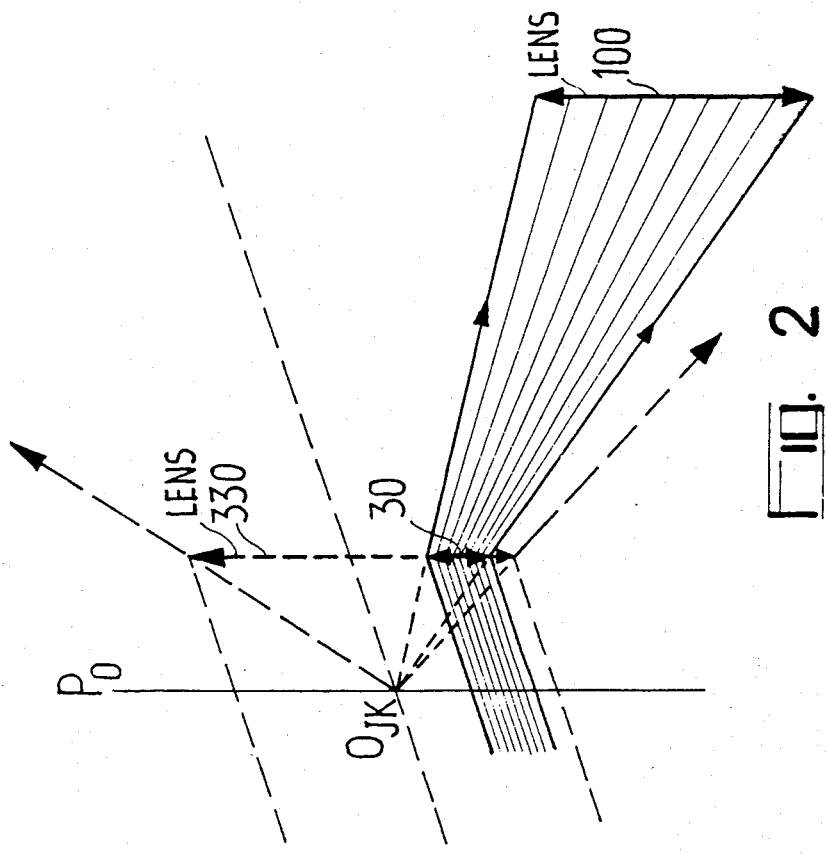

In this figure, a convergent objective 100 which is called the main objective, can be seen, having an optical axis $Z_0Z_1$ linking two planes $P_0$ and $P_I$. A matrix 3 is arranged parallel to $P_0$ and located adjacent this plane; this matrix 3 comprises $P \times P$ lenses of circular contour, diameter $d_L$, arranged in rows and columns spaced at a pitch of $p_L$; these lenses will for example be divergent ones. Each of them has its focus located in the plane $P_0$ so that a parallel light beam 20 displacing by discrete amounts whilst remaining parallel to the fixed direction, and successively scanning all the lenses of the matrix 3, will, whatever the lens scanned, produce a divergent beam issuing from a virtual point or reel point such as the point $O_{JK}$ located at the plane $P_0$, this beam covering the pupil of the objective lens 100. As FIG. 2 shows, these various lenses can be considered as circular portions, such as that 30, cut from a single lens 330, the majority of them being off-centre.

To utilise this matrix of lenses and the main objective lens 100 associated therewith for the recording of microholograms, in the plane $P_I$ or adjacent same, a photosensitive substrate 4 which, after recording, will constitute the storage plane, is provided in, or near, the plane $P_1$. A mount 6, arranged adjacent the objective lens 100, is designed to receive the variable transparencies 60 constituting the data planes, which, once recorded in the form of holograms, will constitute the various pages of the storage plane. A parallel light beam 50, known as the reference beam, scans the surface of the photosensitive substrate 4, displacing by discrete amounts but remaining parallel to a fixed direction. The beams 20 and 50 are produced by a conventional device, not shown in the Figure, but comprising a coherent light source, a two-direction light deflector and a beam-splitter.

A particular lens of the matrix 3 and a particular position of the beams 20 and 50 are associated with each variable transparency introduced into the mounting 6.

Let us consider the case where the beam 20 strikes the lens 30; the latter produces a divergent beam 301, emanating from the virtual point source $O_{JK}$, which beam is transformed by the objective lens 100 into a beam 401, known as the object beam, and converging at $I_{JK}$; the point $I_{JK}$, being the image of $O_{JK}$, is located in the plane $P_I$. The beam 401 illuminates the zone 40 on the photosensitive substrate 4. The device producing the beams 20 and 50 is adjusted so that the beam 21 illuminates this same zone 40 (this adjustment is a simple matter to contrive, if, as shown in FIG. 1, the main objective lens magnification being equal to $-1$, the planes 3 and 4 are symmetrical in relation to the optical centre of the objective lens).

The variable transparency, when introduced into the mounting 6, spatially modulates the intensity of the object beam 401; the interference pattern produced by interference between the object and reference beams is thus recorded in the zone 40 on the substrate 4; this interference pattern constitutes the hologram of the variable transparency introduced into the mounting 6. Thus, by simultaneously displacing the beams 20 and 50, so that the beam 20 successively illuminates the different lenses of the matrix 3, it is possible to record, in the storage planes, as many microholograms or pages, as there are lenses in the matrix; the arrangement of pages in the storage plane reproduces the regular row and column arrangement of the matrix of lenses.

Figure 3:
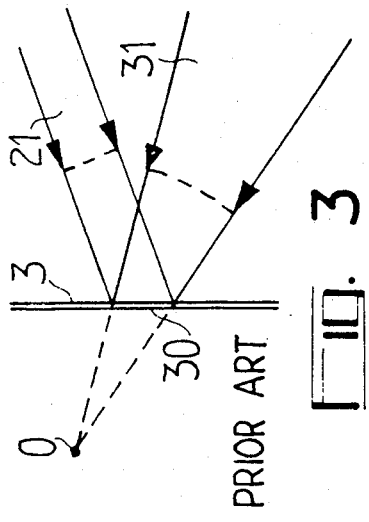
FIG. 3 illustrates a prior art method of recording a holographic lens.
Figure 4:
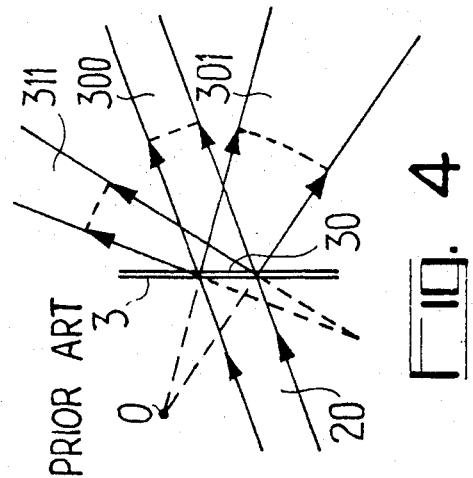
FIG. 4 illustrates the operation, in accordance with the prior art, of a holographic lens.

FIGS. 3 and 4 illustrates a known method of recording a holographic lens similar to those which are produced by the device in accordance with the invention, and also illustrate the operation of said lens.

In FIG. 3, which represents the prior art method of recording, there can be seen two coherent light beams 21 and 31 emanating from one and the same laser source, not shown in the Figure; the beam 21 is a parallel light beam constituted by a plane wave, whilst the beam 31 is a convergent beam formed by a spherical wave converging at a point 0. In the zone of interference between the two beams, a photosensitive substrate 3 is arranged to record the interference zone 30 either in the form of variations in the transparency of the photosensitive medium, or in the form of variations in the refractive index thereof. Zone 30, constituted by fringes whose spacing depends upon the wavelength used and upon the angle subtended by the two beams, constitutes, after development of the photosensitive medium, the holographic lens proper.

FIG. 4 illustrates the behaviour of this kind of lens or of a copy thereof, when illuminated by a parallel light beam 20 in a direction opposite to that taken by the beam 21 which has been used for the recording purpose. In this figure, it has been assumed that the thickness of the medium containing the fringe network does not exceed one hundred wavelengths of the radiation carried by the beam 20, and this is the case with conventional photographic emulsions, the thickness of which is in the order of some fifty microns; the fringes constituting the holographic lens can then be considered as forming a two-dimensional network.

Under these conditions, the beam 20 gives rise to at least three diffracted beams: the parallel beam 300 which forms an extension of the beam 20 and is the diffracted beam of order 0, and two divergent beams 301 and 311 which are the diffracted beams or orders $+1$ and $-1$, symmetrical in relation to the beam 300. If certain precautions concerning the respective intensities of the two beams 21 and 31 are not adopted at the time of recording of the lens, other diffracted beams may appear corresponding to the higher orders $\pm 2$, $\pm 3$ etcetera, etcetera.

Under these conditions, too, the inclination of the beam 20 in relation to the substrate 3 is a matter of arbitrary choice. In the particular case which corresponds to FIG. 4, where the beam 20 has the same inclination in relation to the substrate, as the recording beam 21, the divergent beam 301 appears to issue from the point 0 and thus, with the reverse direction of propagation, reproduces the beam 31 used for recording and shown in FIG. 3.

If, by contrast, the photosensitive substrate 3 is a thick substrate, the interference fringes which are recorded throughout the thickness of the material must be considered as forming a three-dimensional diffraction grating, whose behaviour vis-a-vis light is very close to that of a crystal-line lattice vis-a-vis x-rays, where the BRAGG law applies. It will be seen, in this case, that the holographic lens only transmits radiation if the illuminated beam 20 has the same wavelength as and an inclination, in relation to the substrate 3, very close to, that of the recording beam 21. It will also be seen that there is only a single diffractive beam and this is the beam 301 of order $+1$, issuing from the point 0.

Figure 5:
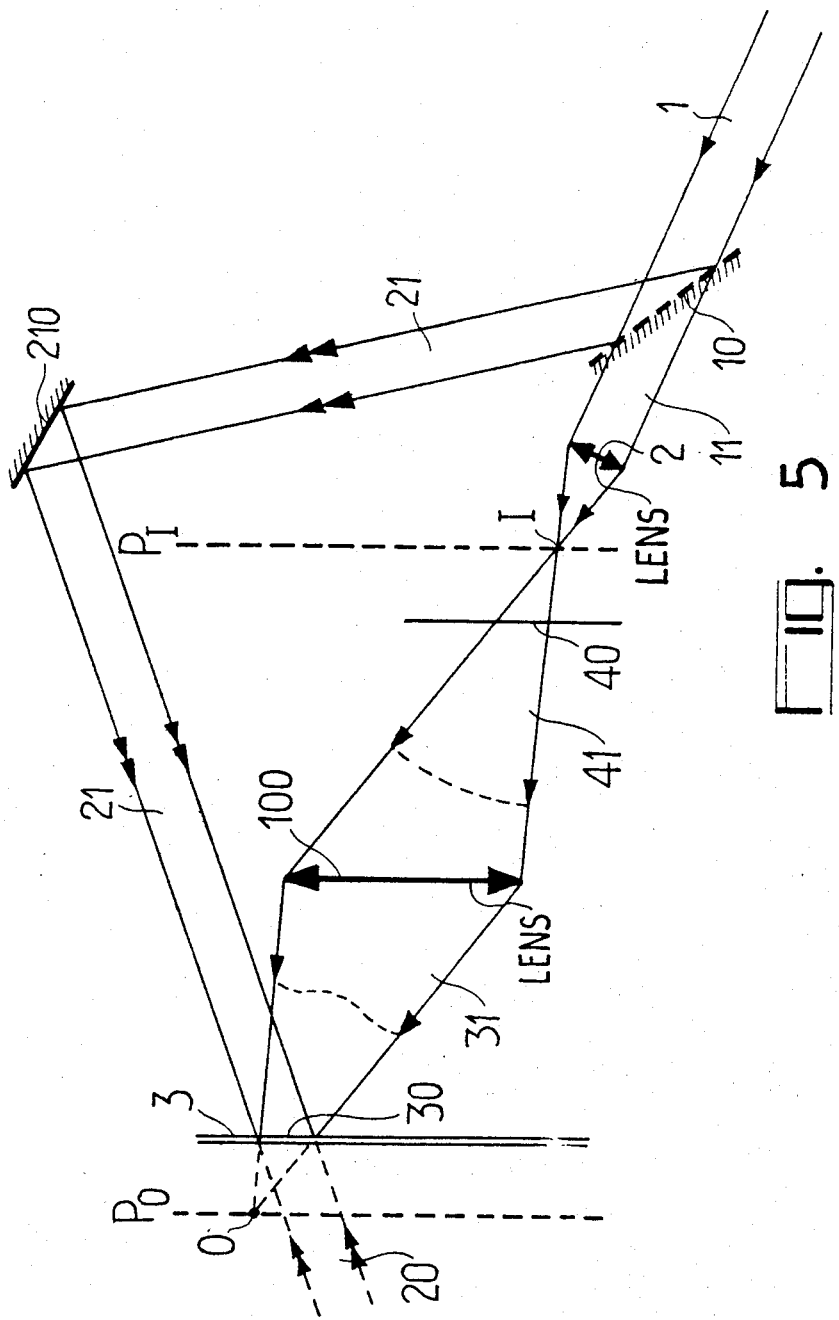
FIG. 5 illustrates the diagram of a first optical device designed for the successive recording of the lenses which make up the matrix, utilising a method in accordance with the invention.

FIG. 5 shows the diagram of a device for recording a matrix of holographic lenses; this device, in a manner inherent in the invention, employs the method of recording a holographic lens, illustrated by FIG. 3.

A parallel coherent light beam 1, emitted by a laser source which has not been illustrated in the Figure, is split into two beams 11 and 21, by a beam-splitter, here represented in the form of the semi-transparent mirror 10. The beam 21 is deflected by the mirror 210 in the direction of a photosensitive substrate 3, on which it illuminates an area 30. The beam 11 is picked up by an objective 2, a microscope objective for example, by which it is converted into a beam converging at a point I; this point I behaves like a point source from which a spherical wave forming the beam 41 is produced. The main objective 100, which can have a substantial entry pupil, receives the beam 41 and produces the beam 31 which converges at the point 0; in FIG. 5, the objective 100 has been illustrated for the case corresponding to a magnification of −1, this magnification being generally best suited to the particular purpose. The beam 31 illuminates on the photosensitive substrate 3 located adjacent the point of convergence, the same area 30 as the beam 21. Thus, in the area 30, a set of interference fringes is recorded, constituting one of the holographic lenses of the matrix.

The assembly constituted by the main objective 100 and the photosensitive substrate 3, is maintained fixed during the recording of the various holographic lenses which constitute the matrix. For each successive recording, the positions of the beam 1 and of the objective 2, are adjusted so that the point I describes the regular matrix points located in a plane $P_I$ parallel to the plane of the objective 100; the point 0 then describes the plane $P_0$ conjugate with the plane $P_1$ by the main objective 100, and the beam 31, on the substrate 3, illuminates areas 30 which are regularly arranged in matrix form. Simultaneously, the positions of the mirrors 10 and 210, are adjusted so that the beam 21 interferes with the beam 31 at the substrate 3, in the area 30.

The significance of the device described hereinbefore, will be better understood from a consideration of FIG. 1 again, this showing how the matrix of holographic lenses thus created can be utilised to record a matrix of microholograms.

From a consideration of this Figure, it will be seen that if the associated matrices (lenses and microholograms) comprise a large number of elements, then it is necessary to use beams whose axis $O_{JK} I_{JK}$ is highly inclined in relation to the optical axis $Z_0 Z_1$, so that the main objective 100 must be a wide-angle objective. In addition, it is well known that the quality of the holograms thus obtained depends in large part upon the optical quality of the spherical wave constituting object beam 401 and this generally presumes that the objective used, although a wide angle objective, will be fully corrected as far as aberrations are concerned. However, it is easy to show that if, in order to carry out recording of the microholograms, the same main objective 100 which has previously been used for recording, or an identical objective is associated with the matrix of holographic lenses 3, these corrections are virtually superfluous.

Considering indeed FIG. 5, it will be seen that at the time of recording of the matrix holographic lenses, the spherical wave issuing from the point source I and forming the beam 41 is transmitted from the main objective 100, if the latter is subject to aberration, in the form of a distorted spherical wave forming the beam 31. The network of fringes recorded upon the substrate 3 and constituting the holographic lens takes account of the morphological alteration in the wavefront surface; so, when a holographic lens of the matrix is illuminated with a beam of parallel light 20 in order to record a microhologram, in the manner shown in FIG. 1, the divergent beam 301 issuing from the holographic lens will be constituted by a distorted spherical wave identical in all respects with the distorted wave transmitted by the beam 31. On re-encountering the main objective 100, but this time in the opposite direction of propagation, this distorted wavefront is reconstituted, at exit from the objective and by virtue of the principle of reciprocal light transmission, in the form of a perfectly spherical wave constituting the convergent beam 401.

The device in accordance with the invention thus enables the use of a single objective, instead of two; moreover, this objective can be of quite ordinary quality. Effectively, the sole requirement as far as correction of the objective aberrations is concerned, is that it should produce throughout the whole of the field used, a diffusion spot less than or equal to the diameter of the holographic lenses constituting the matrix which is to be recorded.

The device as described in FIG. 5, however, calls for successive recording of the different holographic lenses, and, prior to each recording, optical adjustment of the respective positions of the two beams interfering upon the photosensitive substrate. The production of a matrix comprising a high number of elements then becomes an extremely lengthy and delicate business.

In order to overcome this drawback, the invention proposes an improvement in the foregoing device: this improvement enables simultaneous recording of part or all of the lenses making the matrix, by creating from one and the same light source, as many convergent beams, (such as the beam 31 shown in FIG. 5) as there are holographic lenses to be recorded. To do this, a diffraction grating is arranged in the entry pupil of the main objective; this grating is constituted by an opaque screen pierced by a matrix of transparent openings; it provides, from one and the same pinpoint light source, as many convergent beams, constituted by the different diffraction orders of the grating, as there are lenses to be produced; the assembly of these beams is contrived to interfere with a single parallel beam covering that portion of the matrix where simultaneous recording of the lenses is required. The operating of this improved device is described by FIGS. 6, 7 and 8.

In FIG. 6, the diagram representing the optical device, corresponding to the improvement in accordance with the present invention and enabling the simultaneous recording of the whole of the holographic lenses of the matrix, can be seen.

As in FIG. 6, the parallel coherent light beam 1 issuing from a laser source 8, is split into two parallel beams 11 and 21 respectively, by the beam-splitter 10. The microscope objective lens 110 concentrates the beam 11 at a point I which behaves as a pinpoint source from which there emanates the spherical wave forming the beam 41, this beam covering the entry pupil of the main objective (convergent) 100. A photosensitive substrate 3 is arranged perpendicularly to the optical axis $Z_0 Z_1$ of the objective 100, in the neighbourhood of the plane $P_0$ which is conjugated, vis-a-vis said objective lens, with the plane $P_I$ containing the point I; in the Figure, the substrate 3 is illustrated between the plane $P_0$ and the objective lens but can equally be located at the other side of the plane $P_0$.

In distinction from the device illustrated in FIG. 5, the beams 1, 11 and 21 are in this case fixed beams and beam 11 has as its axis the optical axis $Z_0 Z_1$ of the main objective 100. The beam 21, after reflection at the mirror 210, strikes the afocal optical system constituted by the objectives 211 and 212, and leaves it in the form of a parallel beam 200 whose cross-sectional area is sufficiently large to cover the photosensitive surface 3.

Finally, in the entry pupil of the main objective 100, a prime element of this device is arranged, constituted by the diffraction grating 60 which is held in a mounting 6. FIG. 7 illustrates a portion of this grating, formed for example by a screen made up of a material opaque to the radiation carried by the beam 1, in which a matrix of transparent openings, of pitch $p_R$, such as that 600, has been formed. The matrix of openings entirely covers the entry pupil of the objective 100. The shape of the openings is a matter of arbitrary choice, but their size should be small vis-a-vis the pitch; it will be assumed in the following discussion that in accordance with FIG. 7 of the drawing, these openings are in the form of squares of side length $d_R$ ($d_R$ being small in relation to $p_R$), parallel to the axes of the matrix.

In the absence of the screen 60, the beam 41 coming from I, after passing through the objective lens 100, furnishes a single beam convergent at a point $0_{oo}$, the latter being the image of point I and located at the intersection of the plane $P_0$ and the axis $Z_0 Z_1$.

When the grating 60 is introduced into the mounting 6, it splits the beam 41 into an infinity of divergent diffracted beams, each of these appearing to stem from a virtual point $I_{JK}$. The assembly of points $I_{JK}$ is located in the plane $P_I$ in the form of a regular matrix to which there belongs the point I corresponding to the diffracted beam of order (0, 0); the axes of this matrix are parallel to the axes of the matrix formed by the openings in the screen 60.

The main objective 100 causes the diffracted beams to converge at a corresponding number of points $O_{JK}$ which are the respective conjugates of the points $I_{JK}$ and are therefore located in the plane $P_o$, where they are distributed in accordance with a matrix which is the image of the matrix formed by the points $I_{JK}$ in the plane $P_I$. Each diffracted beam thus, on the photosensitive substrate 3, illuminates a zone such as that 30, where it interferes with the beam 200. Outside these zones, the substrate is illuminated only by the beam 200 and consequently no interference fringes are produced. The zones 30 have the same regular arrangement as the points $O_{JK}$ and, after development of the substrate, form a matrix of holographic lenses. Referring to FIGS. 3 and 4 as well as to the accompanying commentaries, it will be seen that each of these holographic lenses, illuminated by a beam of parallel light such as that 20, having the same wavelength and the same angle of incidence in relation to the substrate 3, as the beam 200, will produce a divergent beam which wholly covers the pupil of the objective 100, whatever the position of the lens in the matrix.

It will be seen, furthermore, that the device illustrated by the diagram of FIG. 6, has the advantage, already possessed by the device shown in FIG. 5, that it makes it possible to use for the main objective, a lens in which no more than a very modest correction of the aberrations has been effected, provided that said same lens or an identical objective lens, is utilised successively for the recording of the matrix of holographic lenses and then, in association therewith, for the recording of the matrix of microholograms.

It is also possible, still within the scope of the present invention, to arrange the diffraction grating 60 not in the entry pupil of the objective lense, that is to say between said objective lens and the plane $P_I$, but in the exit pupil, or in other words between the objective lens and the plane $P_o$. However, in this way the advantage of the interesting property referred to hereinbefore, is then lost.

The recording of the matrix of holographic lenses could be carried out in a thin or thick photosensitive medium, in the form of variations in transparency or refractive index of said medium (that is to say, as hereinabove explained, a medium the thickness of which exceeds about one hundred wavelengths of the radiation carried by the beam). Nevertheless, if a thick medium is used then the advantage is achieved (and this has already been explained in the commentaries which accompany FIGS. 3 and 4) that the lenses only produce a single diffracted beam; in this way, it is possible to avoid all the precautions which are otherwise necessary, if the lenses are recorded in a thin medium, in order to prevent parasitic diffractive beams (beams 300 and 311 of FIG. 4) from penetrating into the main objective lens. By carrying out recording in the form of variations in the refractive index of the photosensitive medium, the benefit of a very much better efficiency on the part of the holographic lenses will be secured.

FIG. 8 is a graph illustrating the distrubution of the diffracted intensity along a straight line $x_o x_1$ contained in the plane $P_o$, parallel to the direction of the lines or columns of the matrix formed by the transparent openings created in the diffracting screen 60 and passing through the point of intersection $O_{00}$ of the optical axis $Z_0Z_1$ and the plane $P_o$. The luminous intensities have been plotted upon the ordinates and the length $x$ on the abscissae. The graph, which is the well-known curve illustrated in the distribution of the luminous intensity diffracted by a linear grating, is symmetrical in relation to the ordinate axis and this axis simply carries positive values of $x$.

The diffracted energy exhibits a succession of main maxima which are regularly spaced and correspond to successive diffracted beams of orders (0, 0), (1, 0), (2, 0) etc . . . , converging in the plane $P_o$ at points $0_{0,0}$, $0_{1,0}$, $0_{2,0}$, etc . . . ; between these main maxima, secondary maxima can be seen whose intensities are negligible in relation to those of the main maxima so that the diffracted energy occurring outside these main maxima can be considered as zero. The interval $p_o$ between two successive diffraction orders is given by the well-known relationship:

$$p_o = \lambda r_o / p_R \tag{1}$$

where $\lambda$ is the wavelength of the radiation utilised, $r_o$ is the distance between the objective lens 100 and the plane $p_o$, and $p_R$ the pitch of the matrix of openings in the screen 60.

Considering the graph of FIG. 8, it can be seen that the successive intensity maxima are arranged in accordance with a curve C given by the relationship:

$$I = I_{0,0} \frac{\sin \frac{\pi d_R x}{\lambda r_o}}{\frac{\pi d_R x}{\lambda r_o}}^2$$

where $I_{0,0}$ is the maximum diffracted intensity in the beam of order (0,0) and where $d_R$ is the sidelength of the square openings formed in the diffracting screen. The ratio between the maximum diffracted energies in the beams of orders (M,0) and (0,0) is thus:

$$I_{M,0}/I_{0,0} = \left( \frac{\sin \frac{M\pi d_R}{p_R}}{\frac{M\pi d_R}{p_R}} \right)^2$$

Putting this expression in a general form, we obtain for the ratio between the maximum diffracted energies in the beams of orders (M,N) and (0,0):

$$I_{M,N}/I_{0,0} = \left( \frac{\sin \frac{M\pi d_R}{p_R}}{\frac{M\pi d_R}{p_R}} \right)^2 \times \left( \frac{\sin \frac{N\pi d_R}{p_R}}{\frac{N\pi d_R}{p_R}} \right)^2 \quad (2)$$

and it will be remembered that the distribution of the diffracted energy in the plane $P_o$ by a single square opening of sidelength $d_R$ formed in a screen covering the entry pupil of the objective lens 100, is given by the relationship:

$$I(x,y) = I_{00} \left( \frac{\sin \frac{\pi d_R x}{\lambda r_o}}{\frac{\pi d_R x}{\lambda r_o}} \right)^2 \times \left( \frac{\sin \frac{\pi d_R y}{\lambda r_o}}{\frac{\pi d_R y}{\lambda r_o}} \right)^2 \quad (3)$$

The intensity distribution, as far as the centres of the diffracted beams are concerned, is thus the same as that which would be obtained using a single opening to replace the matrix of openings in the screen.

If correct recording of the matrix of holographic lenses is to be achieved and in particular correct efficiency on the part of all the lenses of the matrix, then it is important that the intensities of the different diffracted beams should be as close as possible to one another. The relationship (2) shows that in order to achieve this result the openings must be given a sidelength $d_R$ which is very small compared with the pitch $p_R$.

The following embodiment enables to see to what extent this result can be achieved.

It is proposed, by utilising the device in accordance with the invention, to record a square matrix of around 140mm sidelength, comprising $p^2 = 101 \times 101$ (or in otherwords around $10^4$) holographic lenses. Thus, the matrix of lenses must be given a pitch:

$p_L = 1.50$ mm

This giving holographic lenses of diameter:

$d_L = 1.00$ mm

To carry out recording, radiation at $\lambda = 6.328$ Å emitted by a helium neon laser is used. The main objective 100 has a focal length of 300 mm and a magnification of $-1$; the plane $P_o$ is then twice this distance from the objective lens, or in other words:

$r_o = 600$ mm

The pitch $p_R$ which the matrix of openings formed in the diffracting screen must be given in order to produce a matrix of lenses having a pitch $p_L$ can be calculated with the help of the relationship (1); as a matter of fact, the photosensitive substrate 3 being located very close to the plane $P_o$, it will be seen, from FIG. 6, that the pitch $p_L$ is very close to the pitch $p_0$ of the matrix constituted by the points $O_{JK}$ in the plane $P_o$; we thus have:

$p_o \simeq p_L$ or in other words:

$p_R = \frac{\lambda r_o}{p_o} = \frac{0.63 \ 10^{-3} \times 600}{1.50}$ mm $= 0.25$ mm The matrix of transparent openings formed in the screen 60 is produced by utilising conventional photoreduction techniques, employing a repeating camera. At the present state of the art, it is still extremely difficult to produce openings having sidelengths substantially shorter than 1.5 microns. The sidelength $d_R$ of the transparent openings has been set at:

$d_R = 1.4 \ 10^{-3}$ mm

Amongst the diffracted beams utilised to record the matrix of lenses, those of higher diffraction order (M,N), and therefore those having the lowest intensity, are those for which:

$M = N = \frac{P-1}{2} = 50$

The relationship (2) thus makes it possible to calculate the intensity of these beams in relation to the intensity of the central beam. If we put:

$i = \frac{(P-1) d_R}{2 p_R} = \frac{100 \ .\pi. \ 1.4 \ 10^{-3}}{2.0.25}$ rad $= 0.88$ rad Then we obtain:

$\sin i = 0.77$
$\frac{\sin i}{i} = 0.875$ or in other words:

$I_{P,P} = I_{00} \left( \frac{\sin i}{i} \right)^4 = 0.59 \ I_{00}$

The diffracted intensity in the beams furthest away from the central beam, is thus around 60% of the diffracted energy in the central beam, so that recording of the lenses can be carried out under acceptable conditions.

This example shows, however, that it is not possible to arbitrarily increase the number of lenses in the matrix without aggravating, at the time of recording, the problems posed by the differences in luminous intensity between the different diffracted beams.

A problem of the same order is posed by the differences in luminous intensity which the parallel lightbeam (beam 1 in FIG. 6) exhibits between its centre and its periphery. As a matter of fact, it is well-known that a laser beam has a radial energy distribution of Gaussian form. If, to achieve maximum luminous intensity, the whole of the beam is utilised, the illumination furnished by the beam 200 at the level of the substrate 3 will also be of much higher intensity at the centre than at the edges.

To overcome these drawbacks and to make it possible to record the lenses of the matrix under identical conditions of illumination, it is proposed in accordance with the invention and as an improvement that, as FIG. 6 shows, in order to form the beam 200, only the central part of the beam 21 should be utilised and that furthermore a variable-transparency plate 7 should be located in the neighbourhood of the photosensitive substrate 3, between said substrate and the main objective 100. This plate, whose optical density is higher at the centre than at the edges, compensates for the decreasing intensity of the diffracted beams, from the centre towards the edges, and can also compensate for the variation in intensity of the beam 200.

The variable-transparency plate 7 will itself be produced from a photosensitive substrate (photographic plate for example) introduced into the device shown in FIG. 6 at the position which said plate 7 is to occupy. The beam 200 is then occulted. The diffracting screen 60 is replaced by a screen of the same size containing a single opening of the same shape, same size and same orientation as the openings forming the matrix in the diffracting screen 60, or, in the example chosen, a screen centrally pierced by a single square opening of side length $d_R$ whose sides have the same orientation, in relation to the edges of the screen, as the sides of the squares which form the matrix. If necessary, the illumination of the orifice will be increased by replacing the objective 110 by an objective of longer focal length. The emulsion and the conditions of illumination and development will be chosen so that the "gamma" coefficient of the Hurter and Driffield curve is equal to unity. The development of the photographic plate thus exposed, results in the production of the plate 7 the transmission coefficient $T(x,y)$ of which, at each point, varies in inverse proportion to the function $I(x,y)$ given by the relationship (3) hereinbefore stated, and thus equalises the intensities of the diffracted beams.

Two variant embodiments of this latter improvement are then possible depending upon whether a greater or lesser fraction of the beam 21 is utilised.

The first variant embodiment takes account of the fact that the two functions which translate the radial variation in the intensity, on the one hand of the different diffracted beams $$\left( \text{function} \left( \frac{\sin x}{x} \right)^2 \right)$$

and on the other hand of the parallel beam 200 (Gaussian function), exhibit variations which differ very little from one another, at least in the neighbourhood of their maxima.

Then, to form the beam 200, a sufficiently large portion of the beam 21 is utilised to ensure that in the absence of the variable-transparency plate 7 the intensity of the beam 200 is substantially equal at all points in the plane 3, to that of the diffracted beams. The plate 7 thus strictly compensates for the variations in intensity of the diffracted beams and approximately compensates for the variation in intensity of the parallel beam.

A second variation of the embodiment consists in utilising only a very small portion of the beam 21 in order to achieve a beam 200 which has an intensity that is virtually uniform throughout. The action of the variable transparency plate 7 on the beam 200 will then be compensated for by arranging, in the manner shown in FIG. 6, a second variable-transparency plate 70 in the pupil of the objective 212, this plate 70 being the photographic negative of the plate 7 and thus having a lower optical density at its edges.

FIG. 9 pertains to a variant embodiment, in accordance with the invention, of that part of the device shown in FIG. 6, which makes it possible, from the point source I, to produce a plurality of beams convergent in the plane $P_0$. This variant embodiment is designed more especially for the case where it is desired, for the recording of the matrix of holographic lenses, to utilise diffracted beams which are very steeply inclined in relation to the optical axis.

It will be remembered in this context that a diffraction grating is only stigmatic when illuminated with parallel light. When illuminated with divergent light, as is the case in the device shown in FIG. 6, from a point light source I, the grating in reality produces beams which appear to stem not from points such as those $I_{JK}$ but from spots centred on these points and having areas which are the larger the more the diffracted beam is inclined in relation to the optical axis. This phenomenon becomes critical when the spots in question are wider than the holographic lens is which it is proposed to record.

To obviate this problem, the variant embodiment of the invention purposes, as FIG. 9 and FIG. 10 show, that the main objective 100 be replaced by two coupled half-objectives 101 and 102, between which the diffracting screen 60 is arranged; the focus of the objective 101 is at the point I and that of the objective 102 at the point $0_{00}$.

Under these conditions, it will be seen that the diffracting screen 60 is illuminated by a flat wave issuing from the objective 101 and produces diffracted flat waves which are made by the objective 102 to converge at the plane $P_0$; the screen 60 thus operates under conditions of stigmatism.

However, if it is desired to associate the two half-objectives 101 and 102 with the matrix of holographic lenses produced with their help, in order to record a matrix of microholograms, then it is essential in the thus-modified device to utilise for the half-objective 101 a wide-angle lens which has been properly corrected for aberration.

As a matter of fact, during the recording of the matrix of lenses, the half-lens 101 is illuminated by a point source arranged on its optical axis in order for the wave arriving on the grating to be pefectly flat; it is then merely necessary for said objective, to be corrected for spherical aberrations. For its part, the half-objective 102, which possesses the property already explained in relation to the objective lens 100 as utilised in the devices of FIGS. 5 and 6, requires no correction for the recording of the matrices either of lenses or of holograms; since the defects in the spherical wave which it transmits to the plane $P_0$ have been recorded by the holographic lense, when illuminated by a lens of the recorded matrix it will reconstitute a wave front which is identical at all points with that transmitted to it by the half-objective 101 and the screen 60. By contrast, during the recording of the matrix of holograms, this perfectly plane wave front may be very steeply inclined in relation to the optical axis and this implies that the objective 101 must then be corrected for aberrations not only on the axis itself but throughout the whole of its angular field.

Since, in the most usual case, the combination of the two-half-objectives 101 and 102 operates at a magnification of −1, these half-objectives will consequently have the same aperture and focal length. It is therefore also frequently a simple matter to combine two identical half-objectives 101 and 102 which have been corrected aberrations throughout the whole of their angular field, by arranging them symmetrically at either side of the screen 60.

Whatever the case, it is essential to correct the two half-objective, whatever the extent of the matrix of holographic lenses, if said matrix is subsequently to be associated with an objective other than that which has been utilised for the recording function.

The optical devices which have been described thus allows to simultaneously record all the holographic lenses which make up a matrix of lenses satisfying the following condition: when an arbitrary lens of the matrix is illuminated by a parallel beam of coherent light in a fixed direction, a diffracted beam is produced which, whatever the lens, passes through a fixed aperture which may for example by the pupil of an objective lens. This matrix can be utilised for recording matrices each of which incorporates as many microholograms as there are lenses and constitutes a storage plane of high capacity utilisable in an optical store; it is then advantageous to utilise for recording of the matrix of lenses the same objective lens which is used for recording the storage plane; under these circumstances, it is permissible, if the matrix of lenses is not too extensive, to use an objective in which correction of aberrations is of very modest level indeed. A device has also been described which makes it possible to record a very extensive matrix and to subsequently associate said matrix with an objective other than that which has been used for its recording.

The descriptions which have been given hereinbefore have been given purely by way of non-limitative examples; other variant embodiments are conceivable without departing from the scope of the invention, in particular an embodiment which consists in giving the matrix of holographic lenses an unequal number of rows and columns and, in particular a single row or column, by the utilisation of a diffraction grating containing elongated openings or even a unidimensional diffraction grating.

What we claim is:

1. A device for simultaneously recording a matrix of holographic lenses, each of said lenses, when illuminated by a monochromatic parallel light beam of fixed direction, producing a reconstituted beam, the whole of said reconstituted beams thus produced illuminating a same common predetermined area, said device comprising:

a radiation source for emitting a beam of coherent light;

splitting means for splitting said beam into a first and a second beam;

optical collimating means for providing for said first beam a parallel beam;

diffracting means for providing from said second beam a plurality of diffracted beams;

a plate of photosensitive material for simultaneously receiving said parallel beam and said plurality of diffracted beams; said parallel beam illuminating in said plate an area at least equal to the area of said matrix; each said diffracted beam illuminating in said plate a distinct area, said distinct areas being arranged at the nodes of said matrix; and said parallel beam interfering in said plate with said plurality of diffracted beams for simultaneously generating said holographic lenses;

first optical projecting means, said first optical projecting means being arranged between said diffracting means and said plate for receiving the whole of the light diffracted by said diffracting means and focussing in the vicinity of said plate said plurality of diffracted beams; and a first non-uniform transparency arranged in front of said plate, said first transparency being crossed by said parallel beam and by said plurality of diffracted beams so as to equalize the luminous intensities of said diffracted beams.

2. A device as claimed in claim 1, wherein said diffracting means are constituted by an opaque screen in which is contrived a matrix of transparent openings.

3. A device as claimed in claim 1, further comprising second optical projecting means, said second optical projecting means being arranged, in relation to said first optical projecting means, at the other side of said diffracting means for receiving light originating from said second beam and projecting a plane wavefront onto said diffracting means.

4. A device as claimed in claim 3, wherein said first and second optical projecting means are two identical lenses.

5. A device as claimed in claim 1, further comprising a second non-uniform transparency arranged on the path of said parallel beam between said collimating means and said first transparency for spatially modulating the intensity of said parallel beam and, in cooperation with said first transparency, equalizing in every point of said plate the luminous energy carried by said parallel beam.

6. A device as claimed in claim 1, wherein said plate of photosensitive material has a thickness at least equal to one hundred wavelengths of said coherent light.

7. A device as claimed in claim 1, wherein said recording is carried out in said plate in the form of variations in the refractive index of said photosensitive material.

* * * * *